US009368924B2

(12) United States Patent
Byrne et al.

(10) Patent No.: US 9,368,924 B2
(45) Date of Patent: Jun. 14, 2016

(54) ELECTRICAL RECEPTACLE ASSEMBLY WITH HOUSING

(71) Applicants: Norman R. Byrne, Ada, MI (US); Patrick E. Young, Rockford, MI (US); Thomas A. Petersen, Sand Lake, MI (US); Randell E. Pate, Jenison, MI (US)

(72) Inventors: Norman R. Byrne, Ada, MI (US); Patrick E. Young, Rockford, MI (US); Thomas A. Petersen, Sand Lake, MI (US); Randell E. Pate, Jenison, MI (US)

( * ) Notice: Subject to any disclaimer, the term of this patent is extended or adjusted under 35 U.S.C. 154(b) by 0 days.

(21) Appl. No.: 14/707,579

(22) Filed: May 8, 2015

(65) Prior Publication Data

US 2015/0325962 A1 Nov. 12, 2015

Related U.S. Application Data

(60) Provisional application No. 61/990,901, filed on May 9, 2014.

(51) Int. Cl.
 *H01R 13/66* (2006.01)
 *H01R 13/73* (2006.01)
 *H01R 13/52* (2006.01)
 *H01R 24/30* (2011.01)
 *H01R 103/00* (2006.01)

(52) U.S. Cl.
 CPC ............ *H01R 13/73* (2013.01); *H01R 13/5205* (2013.01); *H01R 24/30* (2013.01); *H01R 2103/00* (2013.01)

(58) Field of Classification Search
 CPC .. H01R 13/73; H01R 13/5205; H01R 13/639; H01R 4/50
 USPC ............... 439/106, 536, 535, 529; 174/66, 53
 See application file for complete search history.

(56) References Cited

U.S. PATENT DOCUMENTS

| 3,049,688 | A | 8/1962 | Sinopoli | |
|---|---|---|---|---|
| 4,453,059 | A | 6/1984 | Fukushima | |
| 6,042,426 | A | 3/2000 | Byrne | |
| 6,290,512 | B1 * | 9/2001 | Mullen, Jr. | ........... H01R 13/506 439/106 |
| 6,492,591 | B1 | 12/2002 | Metcalf | |
| 6,540,554 | B2 | 4/2003 | McCarthy | |
| 6,782,617 | B2 | 8/2004 | Pulizzi | |
| 6,830,477 | B2 * | 12/2004 | Vander Vorste | ...... H01R 13/743 439/214 |
| 7,182,633 | B2 | 2/2007 | Byrne | |
| 7,407,392 | B2 * | 8/2008 | Cooke | .................... A47B 21/06 108/62 |
| 7,488,203 | B2 | 2/2009 | Leddusire | |
| 7,559,795 | B2 * | 7/2009 | Byrne | .................... H01R 31/06 439/536 |
| 8,444,432 | B2 | 5/2013 | Byrne et al. | |
| 8,480,415 | B2 | 7/2013 | Byrne | |
| 8,480,429 | B2 | 7/2013 | Byrne | |
| 8,512,065 | B2 | 8/2013 | Byrne et al. | |

(Continued)

*Primary Examiner* — Abdullah Riyami
*Assistant Examiner* — Nader J Alhawamdeh
(74) *Attorney, Agent, or Firm* — Gardner, Linn, Burkhart & Flory, LLP

(57) ABSTRACT

An electrical receptacle assembly with protective housing is adapted for installation in unconventional areas or surfaces, including areas that are more susceptible to spills or other contaminants than traditional mounting locations. The electrical receptacle assembly includes a receptacle subassembly with a main receptacle body and a front surface portion in which a plurality of electrical contacts are housed and made accessible to corresponding contacts of an electrical or electronic device. A housing defines a cavity for receiving the receptacle body, and a face plate is coupled to the housing and defines a receptacle opening for engaging and supporting the electrical receptacle subassembly. The face plate may take on many different sizes and shapes for a desired application, while the other components of the electrical receptacle assembly can remain the same.

20 Claims, 11 Drawing Sheets

(56) References Cited

U.S. PATENT DOCUMENTS

| | | | |
|---|---|---|---|
| D701,863 S | 4/2014 | Byrne et al. | |
| 8,736,106 B2 | 5/2014 | Byrne et al. | |
| 8,764,463 B2 | 7/2014 | Byrne et al. | |
| D714,726 S | 10/2014 | Byrne et al. | |
| 2004/0026998 A1 | 2/2004 | Henriott et al. | |
| 2006/0258195 A1 | 11/2006 | Schwartz et al. | |
| 2007/0247037 A1 | 10/2007 | Schenker | |
| 2010/0290215 A1 | 11/2010 | Metcalf et al. | |
| 2011/0109211 A1 | 5/2011 | Kirkeby et al. | |
| 2011/0244700 A1* | 10/2011 | Byrne | H01R 13/52 439/137 |
| 2014/0295691 A1 | 10/2014 | Byrne et al. | |
| 2014/0326726 A1* | 11/2014 | Byrne | H02G 3/081 220/241 |
| 2014/0355231 A1* | 12/2014 | Byrne | H02G 3/185 361/756 |
| 2015/0325962 A1* | 11/2015 | Byrne | H01R 13/73 439/529 |
| 2015/0333461 A1 | 11/2015 | Byrne et al. | |

\* cited by examiner

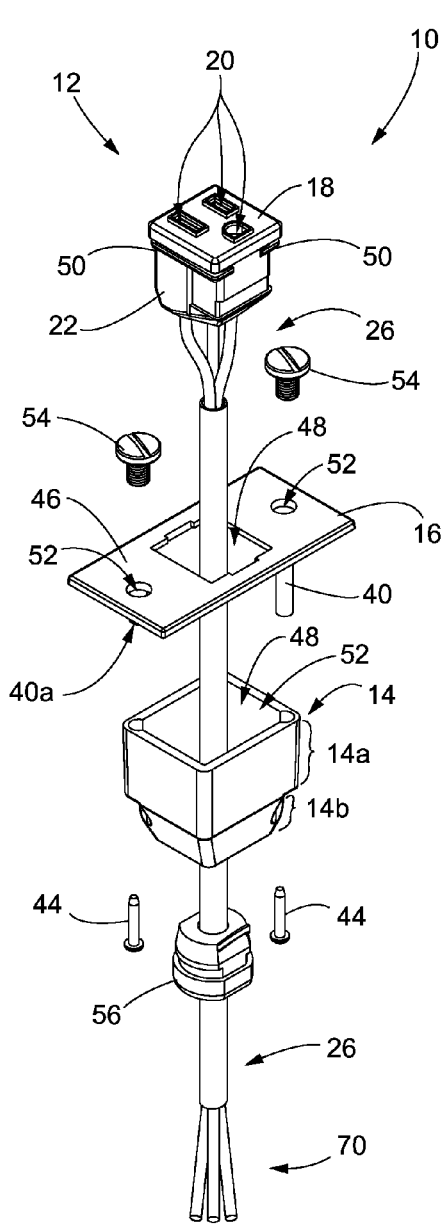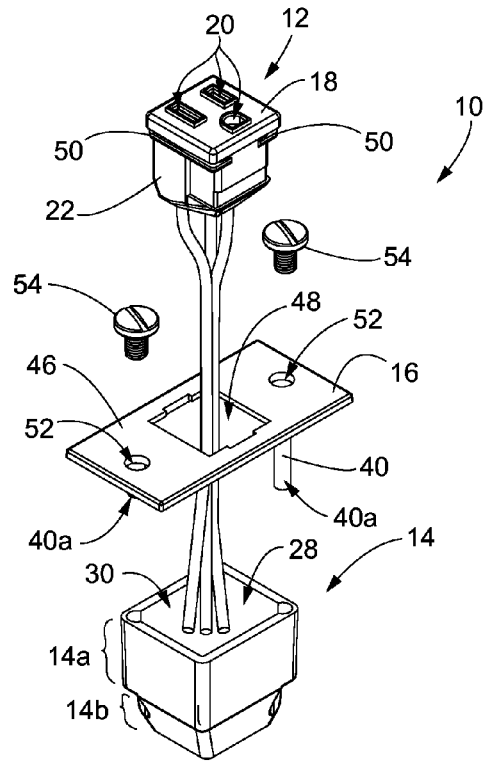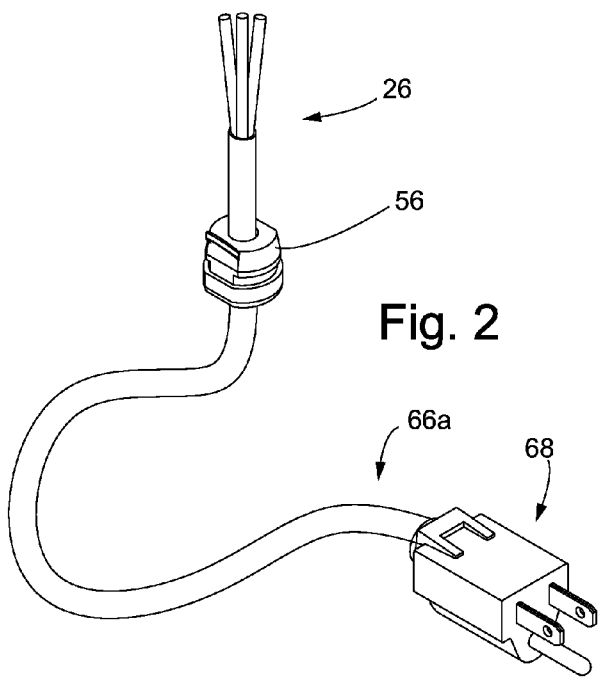
Fig. 1
Fig. 2

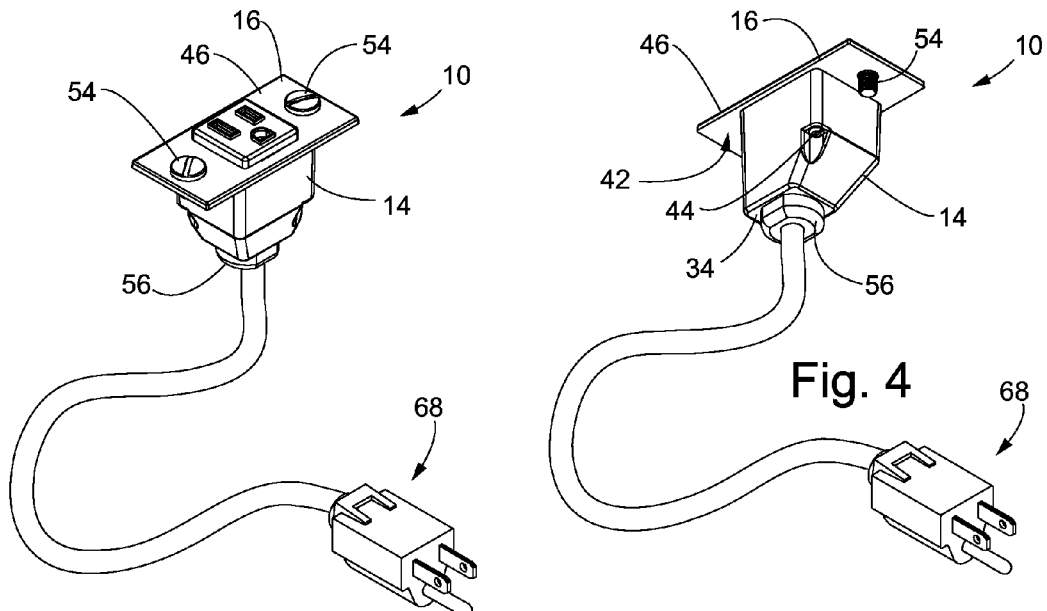
Fig. 3
Fig. 4
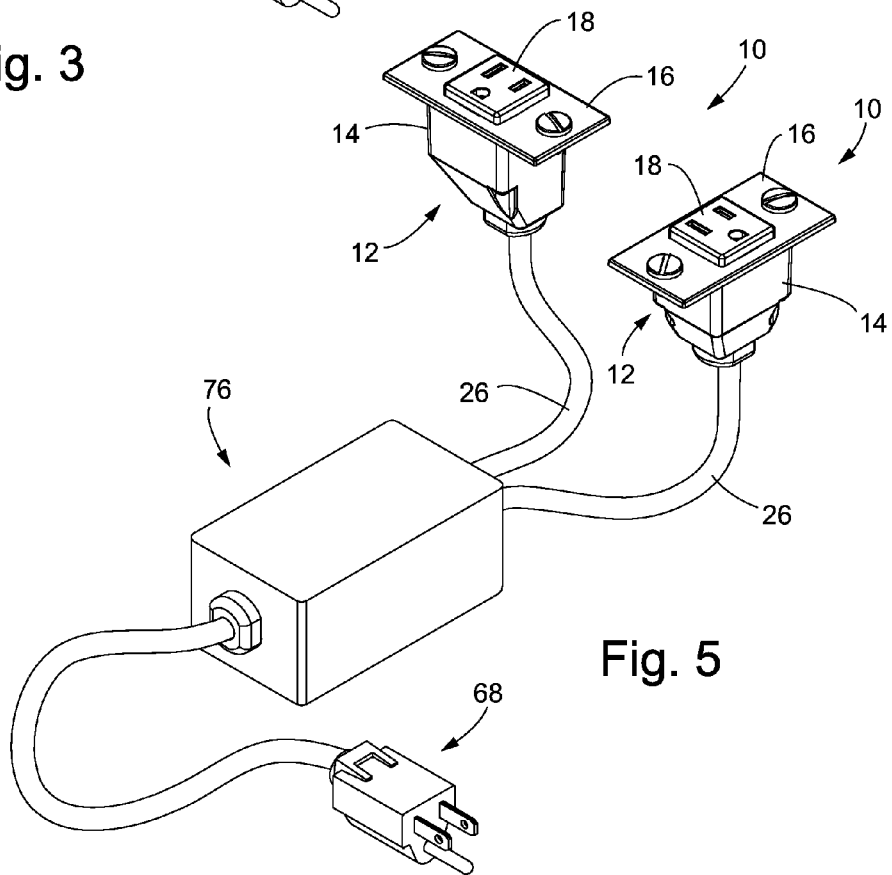
Fig. 5

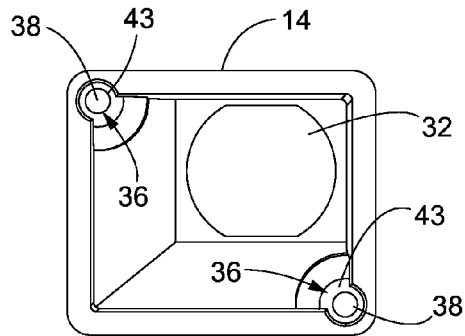
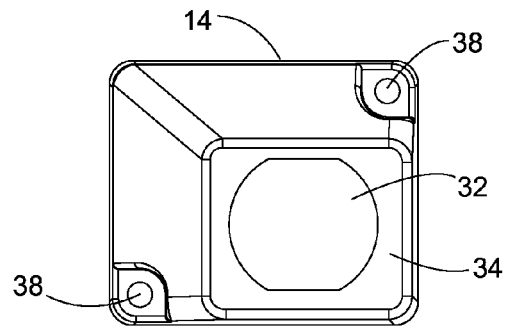
Fig. 17  Fig. 18
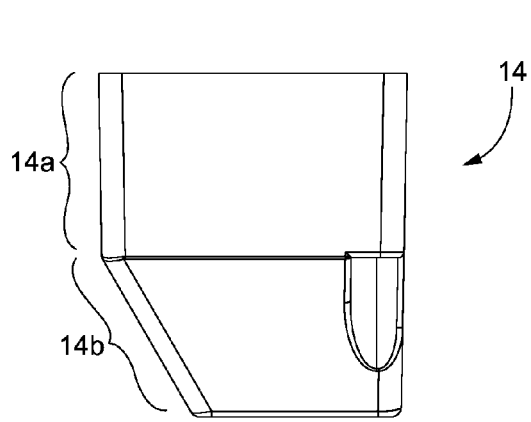
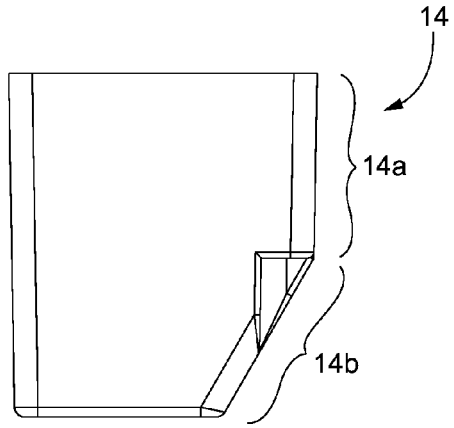
Fig. 19  Fig. 20
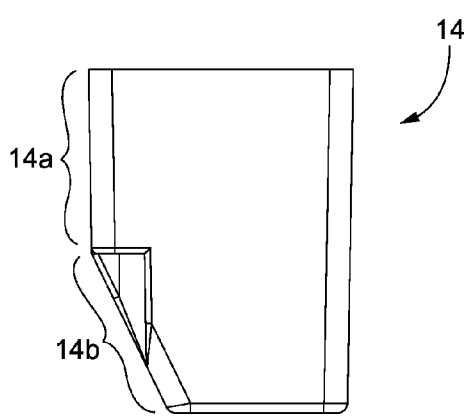
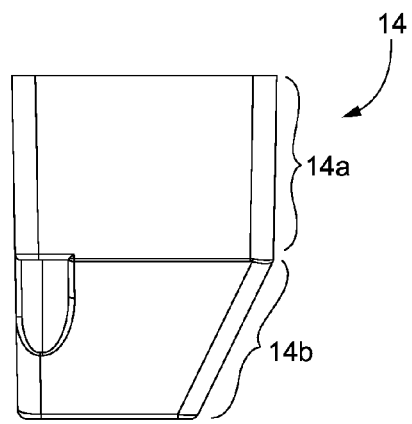
Fig. 21  Fig. 22

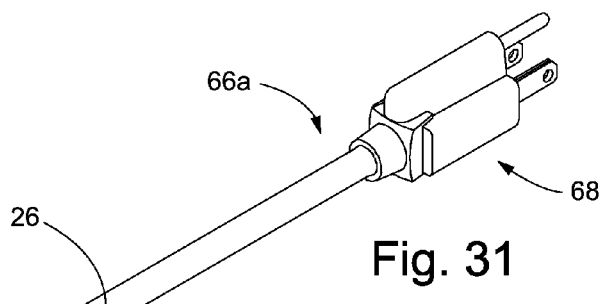
Fig. 31
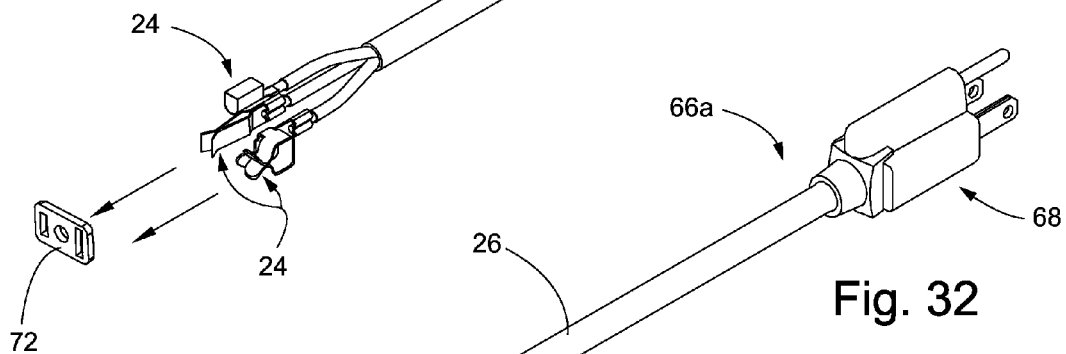
Fig. 32
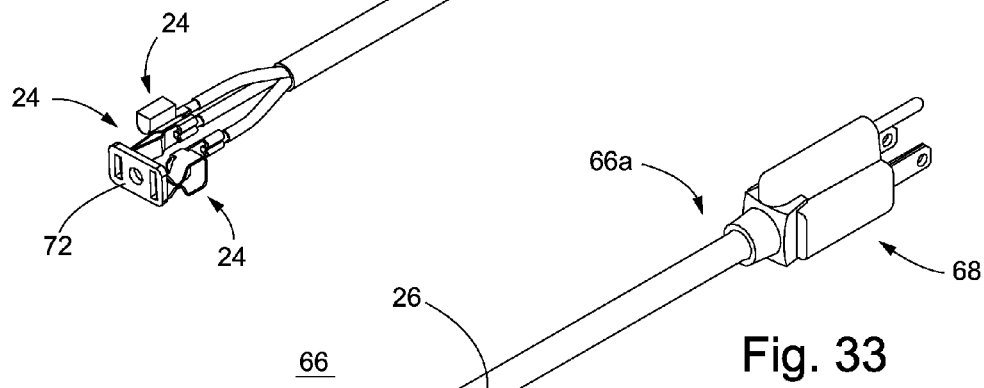
Fig. 33
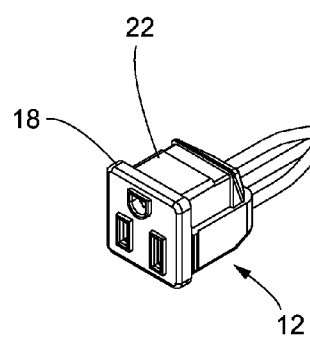

ELECTRICAL RECEPTACLE ASSEMBLY WITH HOUSING

CROSS REFERENCE TO RELATED APPLICATION

The present application claims the benefit of U.S. provisional application Ser. No. 61/990,901, filed May 9, 2014, which is hereby incorporated by reference in its entirety.

FIELD OF THE INVENTION

The present invention relates to electrical power and data outlet or receptacle assemblies and, more particularly, to housings or boxes used to mount outlets and receptacles along a surface.

BACKGROUND OF THE INVENTION

The need or desire to incorporate electrical power outlets, electronic data outlets, communications jacks, etc. into small spaces has increased as portable electronic devices such as laptop computers, mobile phones, digital cameras, and the like have proliferated, since these devices often require charging from high voltage AC or low voltage DC power sources, and some devices still rely on wired electronic data communications, including for audiovisual presentations and the like. However, typical electrical and/or data outlets and jacks are not well-suited for installation in small spaces, and may not meet required or desired performance and safety specifications for resistance to liquid spills or other contaminants.

SUMMARY OF THE INVENTION

The present invention provides an electrical receptacle assembly with housing that is compact to permit or facilitate its installation in small and non-traditional spaces, such as in furnishings or other electrical devices or appliances, and which is also resistant to liquid spills or other forms of contaminants. The assembly includes a one-piece housing that is sized and shaped to closely conform to an electrical receptacle body that is received in the housing. The housing cooperates with other components with the assembly to substantially seal out contaminants while providing a strain relief, protecting the electrical receptacle body from physical damage, and being sufficiently compact to be incorporated into small spaces. Different types of face plates are configured to support the electrical receptacle and couple to the housing, and are used to adapt the assembly for different types of desired installations without requiring modifications to the other components of the assembly.

According to one form of the present invention, an electrical receptacle assembly includes an electrical receptacle subassembly, a housing defining a cavity, and a face plate coupled to the housing and supporting the electrical receptacle subassembly. The receptacle subassembly has a main receptacle body, a front surface portion defining at least one opening, electrical wiring, and a plurality of electrical contacts, which are accessible through the at least one opening and are configured to engage electrical contacts of a plug associated with an electrical consumer or an electronic data device. The housing has a front opening through which the main receptacle body is received, for positioning the receptacle body in the housing cavity, and further includes a rear opening through which passes the electrical wiring associated with the electrical receptacle subassembly. The face plate defines a receptacle opening for engaging and supporting the electrical receptacle subassembly, by engaging the subassembly at either or both of the main receptacle body and the front surface portion.

In one aspect, the hollow projection extends from the face plate into the housing, in which is formed a fastener opening that is aligned with the hollow projection when the face plate is attached to the housing. A fastener extends through the fastener opening and engages the hollow projection of the face plate to secure the face plate to the housing. Optionally, the hollow projection is a tubular cylinder, and the housing defines an elongate channel that is sized and shaped to receive the tubular cylinder, with the elongate channel terminating at the fastener opening.

In another aspect, the base plate may be formed in various different shapes including polygonal or circular, and may be generally planar, or optionally non-planar, such as arcuate.

In yet another aspect, the face plate sealingly engages the housing at the front opening thereof. Optionally, a wire grommet is positioned in the rear opening of the housing and receives the electrical wiring associated with the electrical receptacle subassembly, to provide a contaminate-resistant seal and strain relief for the electrical wiring. In a further aspect, the assembly further includes an electrical plug with an insulative body and a plurality of male prongs in electrical communication with the electrical wiring of the electrical receptacle subassembly, with a contiguous molded rubber or rubber-like insulative coating that forms the main receptacle body and front surface portion of the electrical receptacle subassembly, and also forms the insulative body of the electrical plug and an insulative jacket around the electrical wiring disposed between the main receptacle body and the electrical plug, the insulative coating also filling spaces between the electrical contacts of the electrical receptacle subassembly.

Thus, the electrical receptacle assembly and housing of the present invention permits electrical power, electronic data and/or communications outlets, which are resistant to liquid spills or other contaminants, to be positioned in non-traditional locations such as chair arms, in tables or table legs or other furnishings, or in lamps or other electrical devices.

These and other objects, advantages, purposes and features of the present invention will become apparent upon review of the following specification in conjunction with the drawings.

BRIEF DESCRIPTION OF THE DRAWINGS

FIG. 1 is an exploded perspective view of an electrical receptacle assembly in accordance with the present invention;

FIG. 2 is an exploded perspective view of another electrical receptacle assembly in accordance with the present invention;

FIG. 3 is a perspective view of the electrical receptacle assembly of FIG. 2, shown in an assembled configuration;

FIG. 4 is a bottom perspective view of the electrical receptacle assembly of FIG. 3;

FIG. 5 is a perspective view of another electrical receptacle assembly in accordance with the present invention, having two separate electrical receptacles;

FIG. 17 is a top plan view of the housing of the FIGS. 16A-16D;

FIG. 18 is a bottom plan view of the housing;

FIG. 19 is a front elevation of the housing;

FIG. 20 is a rear elevation of the housing;

FIG. 21 is a left side elevation of the housing;

FIG. 22 is a right side elevation of the housing;

FIG. 31-33 depict three stages of assembly of an electrical receptacle subassembly of the electrical receptacle assembly;

DESCRIPTION OF THE PREFERRED EMBODIMENTS

Figure 6:
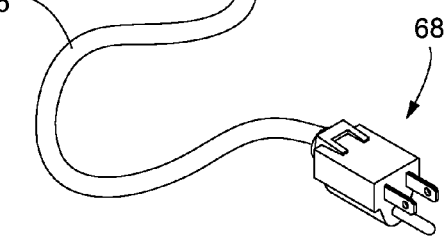
FIG. 6 is a perspective view of another electrical receptacle assembly having a circular face plate.
Figure 7:
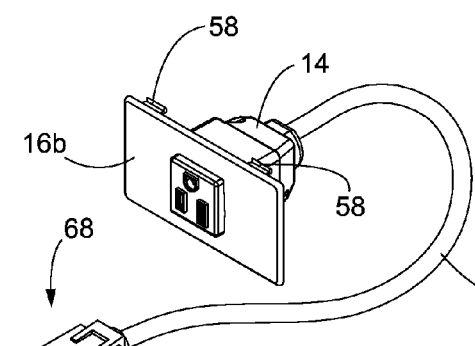
FIG. 7 is a perspective view of another electrical receptacle assembly having a rectangular face plate with latch tabs.

An electrical receptacle assembly with housing is provided for installation in small spaces, and is particularly well suited for applications or locations that are susceptible to liquid spills or other contaminants, such as along tables, chair arms or other furnishings, along seating or small work areas found in public transportation vehicles, in private vehicles, or in waiting areas, table lamps and other electrical devices, and the like. The size, shape, and ability to seal out liquids or other contaminants with a housing associated with the electrical receptacle assembly facilitates their installation in such locations, including those where there is limited space available, and where the outlet openings may be susceptible to contaminants. Thus, electrical power receptacles, electronic data receptacles, and communications jacks or outlets may be installed in non-traditional locations (i.e. outside of a typical wall jack or power strip, for example) according to the needs of a particular user or work area. For example, such outlets may include one or more high voltage (e.g., 110V or 120V AC) standard power outlets, one or more low voltage power outlets (e.g., USB charging ports rated at about 2V to 6V DC), and one or more electronic data ports (e.g., telephone, Ethernet, audio, video, HDMI, USB, etc.).

Throughout this specification, the terms "upper" or "top", "lower" or "bottom", "front", "back", and "under" are used to denote relative directions as seen by a viewer facing the electrical receptacle assembly, and/or a power or data center incorporating the electrical receptacle assembly, from a normal access position. Such terms are used to facilitate understanding of the embodiments of the invention with reference to the drawings, and should not be construed as being limiting in any way.

Referring now to the drawings and the illustrative embodiments depicted therein, an electrical receptacle assembly 10 includes an electrical receptacle subassembly 12, a housing 14, and a face plate 16, such as shown in FIGS. 1-5. As will be described in more detail below, receptacle subassembly 12 includes a front surface portion 18 defining a plurality of openings 20, a main receptacle body 22 containing electrical contacts 24 (FIGS. 31, 32, and 37), and electrical wiring 26. Electrical contacts 24 are accessible through respective ones of the openings 20 and are configured to engage electrical contacts or prongs of a plug from an electrical consumer (e.g., a portable computer, phone, appliance, or the like) or an electronic data or audio/video device.

Housing 14 defines a cavity 28 for receiving main receptacle body 22, with the cavity 28 being accessible through a front opening 30 through which receptacle body 22 is inserted. In addition, a rear opening 32 provides a pass-through for electrical wiring 26, such as shown in FIGS. 1 and 4. Housing 14 includes a generally rectangular upper or forward housing portion 14a of substantially constant cross-section, and a tapered lower or rearward housing portion 14b that is closed off by a lower or rear housing wall 34 that defines rear opening 32 (FIG. 18). Tapered rearward housing portion 14b facilitates installations in tight spaces, and may permit or facilitate limited "wedging" of the housing into tight spaces during installation.

Figure 15:
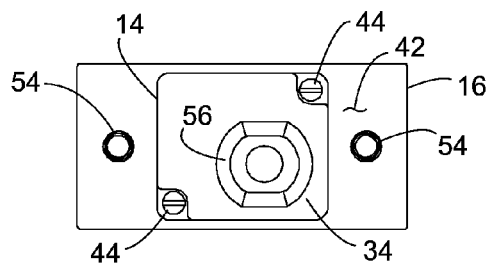
FIG. 15 is a bottom plan view of the electrical receptacle assembly.
Figure 16A:
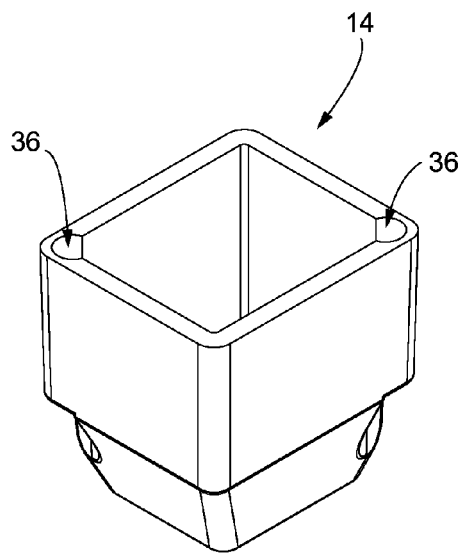
FIGS. 16A-16D are top perspective views of the housing of the electrical receptacle assembly.
Figure 16B:
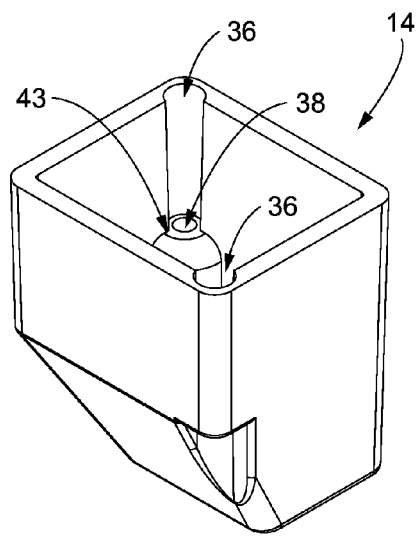
Figure 16C:
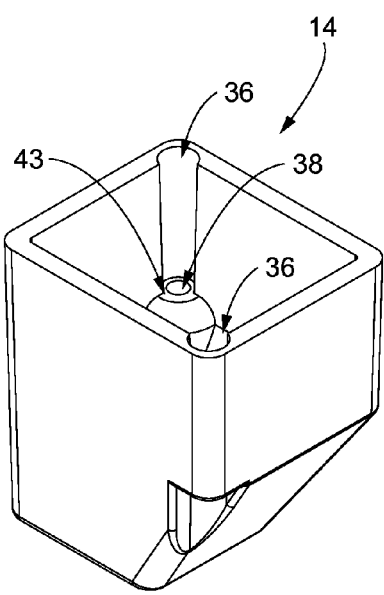
Figure 16D:
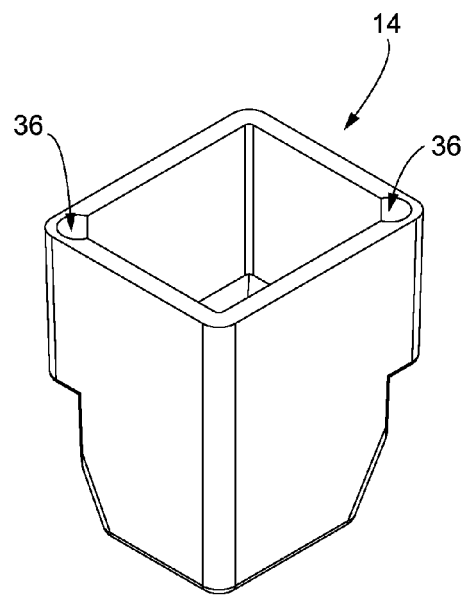
Figure 23:
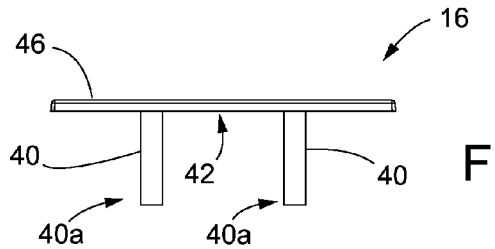
FIG. 23 is a front elevation of the face plate of the electrical receptacle assembly.
Figure 24:
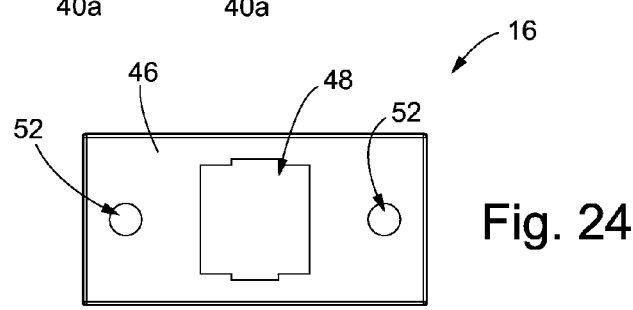
FIG. 24 is a top plan view of the face plate.
Figure 25:
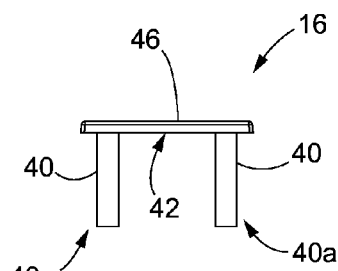
FIG. 25 is a right side elevation of the face plate.
Figure 26:
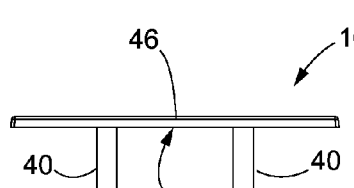
FIG. 26 is a rear elevation of the face plate
Figure 27:
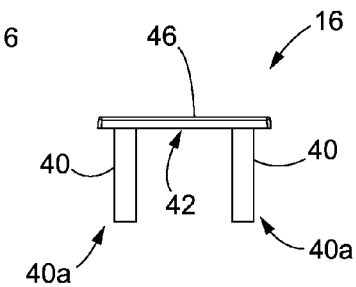
FIG. 27 is a left side elevation of the face plate.

As best shown in FIGS. 1, 2, and 16A-17, housing 14 has two elongate channels 36 defined in respective opposite interior corners that, in the illustrated embodiment, are open to housing cavity 28, and which terminate in respective fastener openings 38 that are formed in or through rear surfaces of upper housing portion 14a, where the transition to the lower housing portion 14b begins, such as shown in FIGS. 15 and 18. Housing 14 may be a one-piece component made of molded resinous plastic or cast metal, or may be machined from a block of material, for example.

Figure 28:
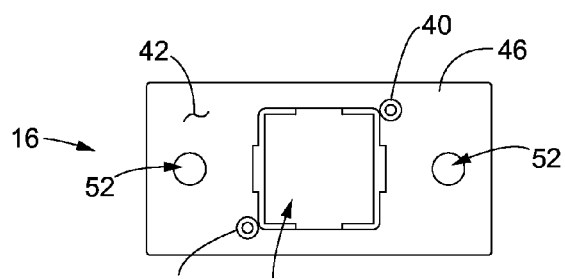
FIG. 28 is a bottom plan view of the face plate.
Figure 29:
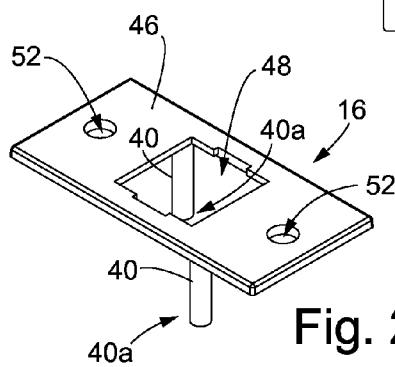
FIGS. 29 and 30 are top perspective views of the face plate.
Figure 30:
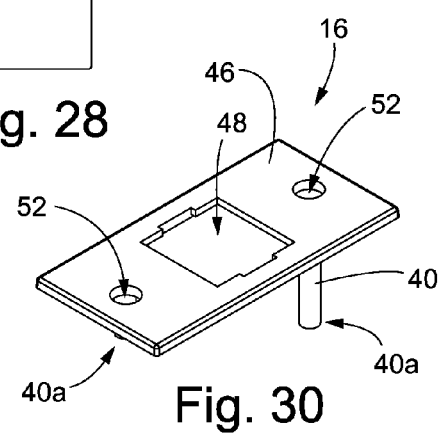

In the illustrated embodiment, elongate channels 36 are generally cylindrical in shape, except for the open side portions that face cavity 28 (FIG. 17). Channels 26 are sized and shaped to receive respective hollow projections 40 that extend from a rear surface 42 of face plate 16, such as shown in FIGS. 23 and 25-28. Hollow projections 40 are cylindrically tubular in shape, such as shown in FIG. 28, and are positioned along face plate 16 so as to align with the respective elongate channels 36 of housing 14 during assembly. With hollow projections 40 inserted into the elongate channels 36 of housing 14, distal ends 40a of hollow projections 40 abut or lie in close proximity to respective interior surfaces 43 of housing 14 at fastener openings 38, so that fasteners such as threaded screws 44 (FIGS. 1, 4, and 15) may be inserted into fastener openings 38 from below/behind and threadingly engaged in the openings formed at distal ends 40a of hollow projections 40, which is shown in FIGS. 12-15. Optionally, hollow projections 40 are made of resinous plastic or a relatively soft metal, such as aluminum, so that screws 44 may engage distal ends 40*a* in a self-tapping manner.

Face plate 16 has a generally planar mounting surface 46 that, in the embodiments of FIGS. 1-5, 7, 10-15, and 23-30, is rectangular in shape when viewed in plan (e.g., FIGS. 11, 15, 24, and 28), and defines a central opening 48 that is sized and shaped to receive electrical receptacle subassembly 12. In the illustrated embodiment, electrical receptacle subassembly 12 is fully seated in central opening 48 of face plate 16 when an inner perimeter portion of the planar mounting surface 46 (that defines central opening 48) engages electrical receptacle subassembly 12 at a forward end of main receptacle body 22, between a pair of ridges 50 and a rear surface of front surface portion 18 (e.g., compare FIGS. 1 and 2 with FIGS. 3 and 5). It will be appreciated that the engagement of main receptacle body 22 in central opening 48 may establish a substantially sealed interface that limits or prevents the intrusion of liquids or other contaminants into housing cavity 28. In addition, planar mounting surface 46 defines a pair of openings or bores 52 for receiving respective fasteners such as mounting screws 54, which are used to secure electrical receptacle assembly 10 to another surface, such as an article of furniture, with housing 14 disposed in a cavity or opening formed or established in the surface to which mounting screws 54 are attached. Face plate 16 and hollow projections 40 may be unitarily formed from a single piece of resinous plastic, such as via molding, or may be unitarily formed or constructed of three separate parts in metal, resinous plastic, or any other suitable material.

Figure 8:
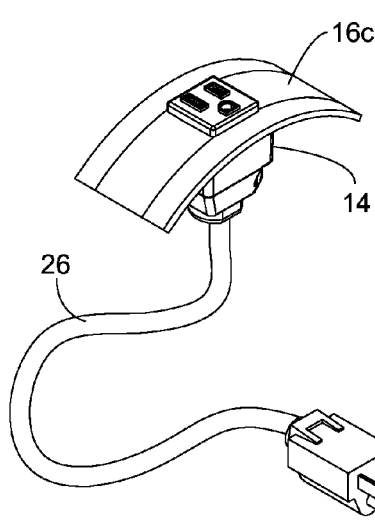
FIG. 8 is a perspective view of another electrical receptacle assembly having an arcuate face plate.
Figure 9:
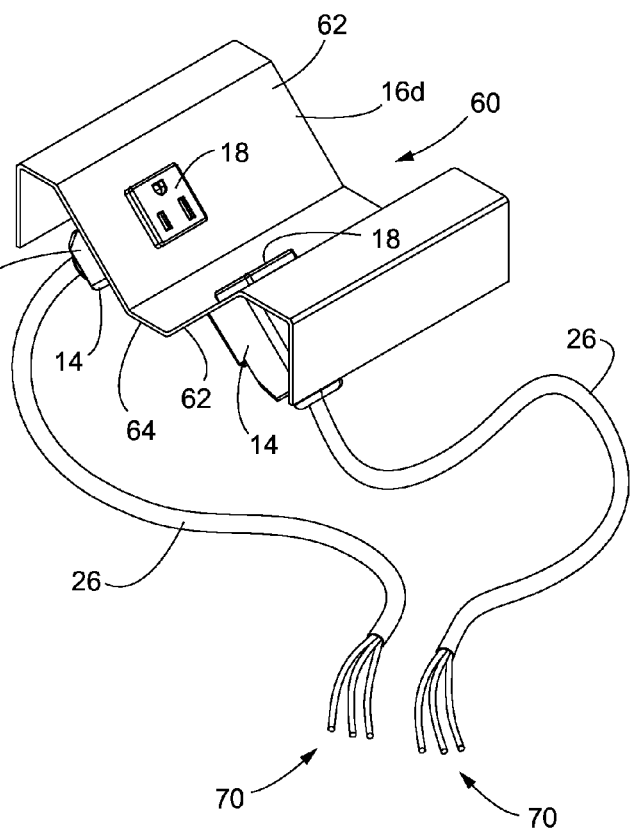
FIG. 9 is a perspective view of pair of electrical receptacle assemblies sharing a single formed channel member as a face plate.
Figure 10:
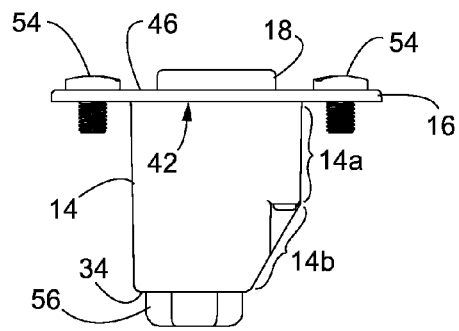
FIG. 10 is a rear elevation of the electrical receptacle assembly.
Figure 11:
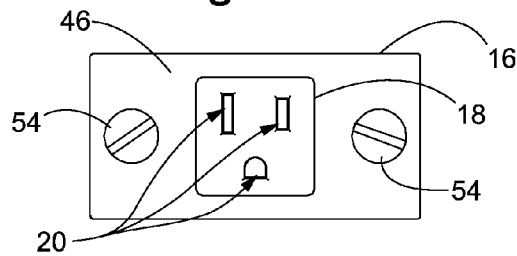
FIG. 11 is a top plan view of the electrical receptacle assembly.
Figure 12:
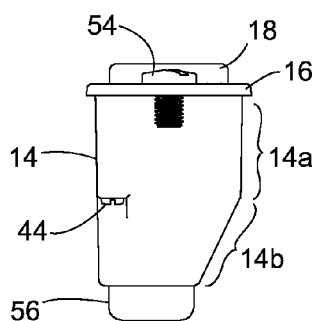
FIG. 12 is a right side elevation of the electrical receptacle assembly.
Figure 13:
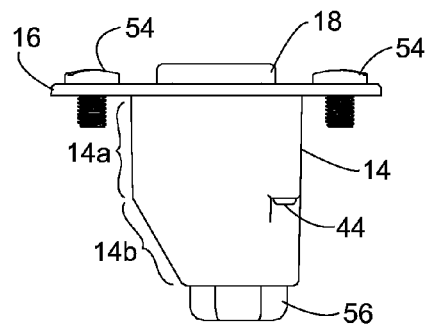
FIG. 13 is a front elevation of the electrical receptacle assembly.
Figure 14:
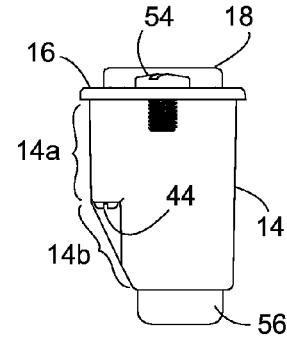
FIG. 14 is a left side elevation of the electrical receptacle assembly.

Optionally, the face plate may be formed in different shapes to suit substantially any desired installation area or surface. For example, and with reference to FIGS. 6-19, a circular face plate 16*a* (FIG. 6) is functionally the same as face plate 16, except that face plate 16*a* is circular in plan view, which may provide a desired aesthetic appearance or may provide a better fit in a given installation area than rectangular face plate 16. Another rectangular face plate 16*b* (FIG. 7) includes a set of resilient latch tabs 58 at its outer perimeter, for releasable snap-engagement with surfaces defining a recessed area or cavity in a mounting surface. It is envisioned that latch tabs 58 or similar structures may obviate the need for mounting screws 54 or other hardware, to present a cleaner appearance. An arcuate face plate 16*c* (FIG. 8) facilitates mounting the assembly along an arcuate surface, such as a chair arm, a lamp base, or the like. Optionally, an upper or front surface of the housing may be correspondingly shaped (i.e., convex) so as to form an appropriate seal with a concave rear surface of arcuate face plate 16*c*. However, it may be permissible to allow a gap between the front surface of the housing and a rear surface of the face plate, particularly when electrical receptacle subassembly 12 is a sealed component. In still another embodiment, a single formed face plate 16*d* (FIG. 9) is shared by two or more electrical receptacle subassemblies 12 and respective housings 14. Formed face plate 16*d* defines a recessed channel 60 with a pair of sloped surfaces 62 on either side and joined by a planar bottom surface 64. Substantially any desired number of electrical receptacle subassemblies 12 may be installed along sloped surfaces 62 (or other surfaces) of face plate 16*d*, which is mountable beneath an opening formed in a work surface such as a table or desk, for example.

Figure 38A:
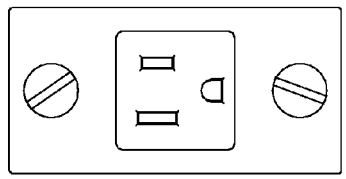
FIGS. 38A-38G are top plan views of exemplary different configurations and receptacles of electrical receptacle assemblies in accordance with the present invention.
Figure 38B:
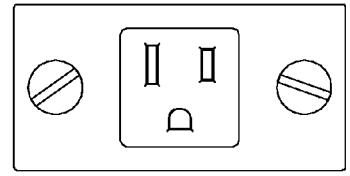
Figure 38C:
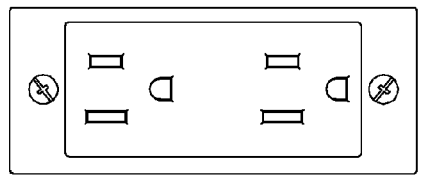
Figure 38D:
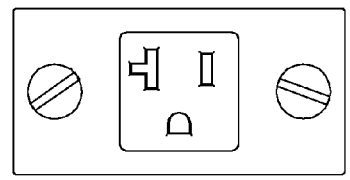
Figure 38E:
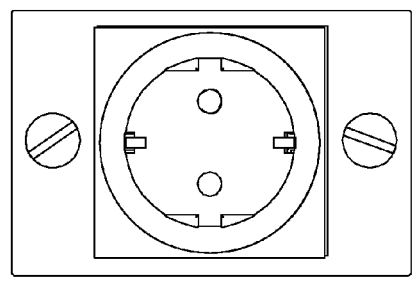
Figure 38F:
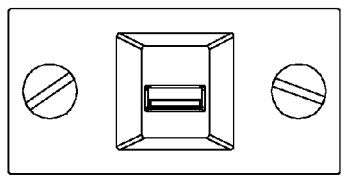
Figure 38G:
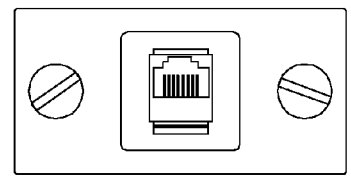

Still other face plates having different rectangular dimensions are illustrated in FIGS. 38A-38G, in which the face plates and their respective openings are sized for different types and numbers of electrical or electronic data or communications outlets. For example, a 110V simplex receptacle may be mounted in different orientations such as shown in FIGS. 38A and 38B, a duplex receptacle may be accommodated using a lengthened face plate and housing such as shown in FIG. 38C, a high-amperage (e.g. 20-amp) simplex receptacle (FIG. 38D) may be accommodated in the same manner as lower-amperage simplex receptacles, and it will be appreciated that substantially any other type of high or low voltage receptacle can be accommodated, such as a 220V receptacle (FIG. 38E) or a low-voltage DC receptacle such as USB-style receptacle (FIG. 38F), or a telephone or Ethernet port (FIG. 38G). It is further envisioned that face plates may have substantially any polygonal or curved shape in plan view, and may also have an arcuate (non-planar) shape in elevation view, such as the face plate 16*c* (FIG. 8) that is described above, without departing from the spirit and scope of the present invention. For each face plate, it is envisioned that one or more hollow tubular members may be used to align and secure the face plate to a respective housing 14 such as in the manner described above with respect to face plate 16.

Optionally, a wire grommet 56 of relatively soft, flexible material such as natural or synthetic rubber, may be fitted around electrical wiring 26 and is insertable into rear opening 32 of housing 14, to provide a seal for cavity 28 and a strain relief for wiring 26. Grommet 56 may be threaded onto wiring 26 during assembly of electrical receptacle assembly 10, or prior to molding receptacle body 22, for example.

Figure 34:
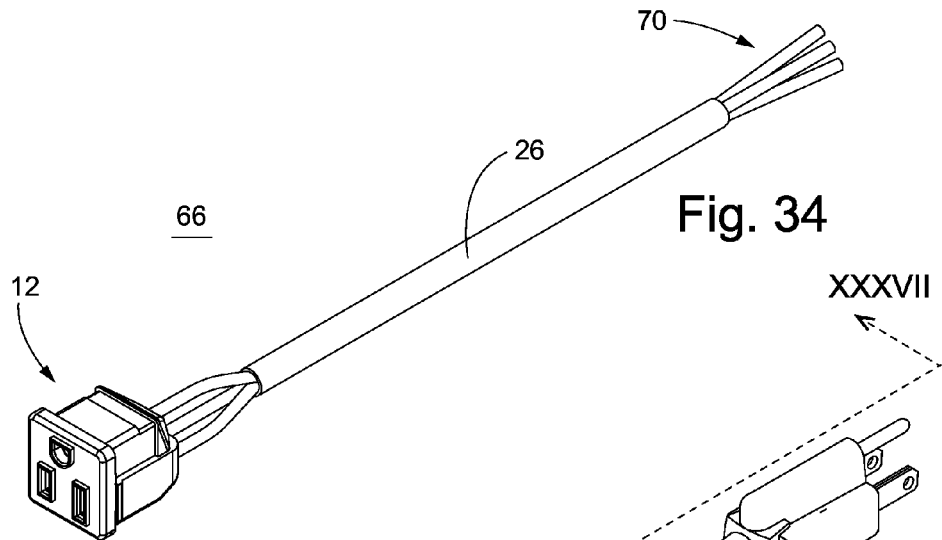
FIG. 34 is a perspective view of another electrical receptacle subassembly configured for hard wiring to an electrical power source.

Referring now to FIGS. 31-33, a three-step sequence of assembling a complete wiring harness 66 (including the electrical receptacle subassembly 12 and wiring 26 described above) is shown. In FIGS. 31-33, wiring harness 66 terminates at a power-input end 66*a* fitted with a conventional male plug 68, although it will be appreciated that bare wiring 70 (FIGS. 1, 9, and 34) may be substituted, such as for hardwired installations. Wiring harness 66 has a power-output end 66*b* that terminates in separate conductors coupled to respective ones of the electrical contacts 24 (typically hot, neutral, and ground for high voltage AC power applications, shown). An alignment piece 72 (FIGS. 31 and 32) is positioned in front of the hot and neutral contacts 24 and main receptacle body 22 and front surface portion 18 are molded together over and around and between contacts 24 and alignment piece 72, as well as around exposed conductors and portions of insulator coatings of the individual conductors of wiring 26 (FIG. 33), so that all conductive surfaces inside of receptacle body 22 are electrically isolated by molded material, such as synthetic rubber or other polymeric or resinous plastic material.

Figure 35:
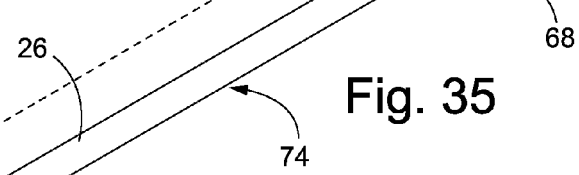
FIG. 35 is a perspective view of another electrical receptacle of subassembly having a male plug for connecting to a conventional electrical power receptacle.
Figure 36:
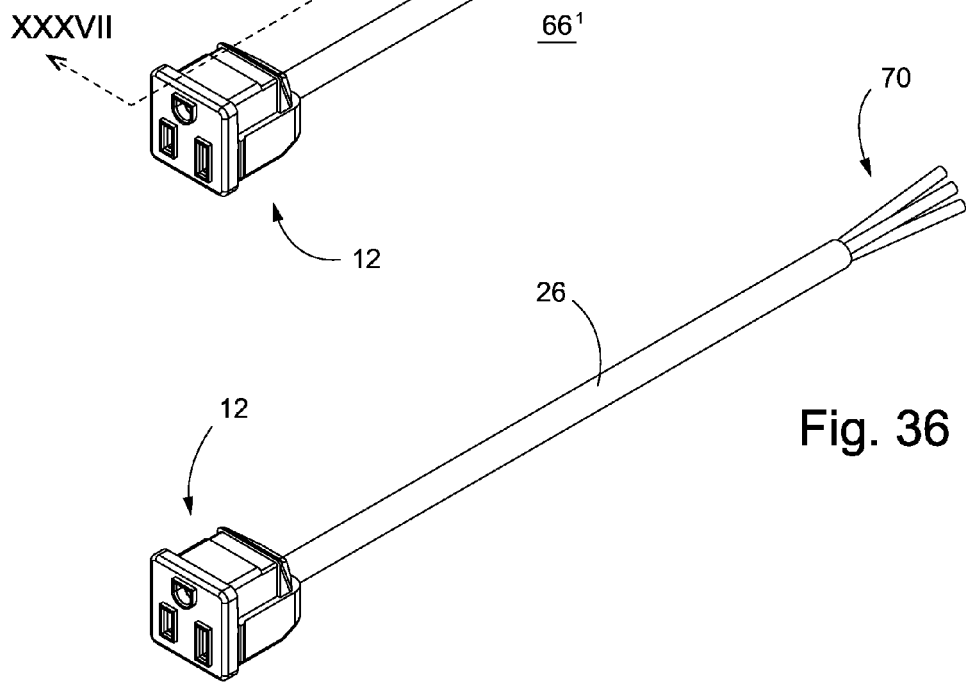
FIG. 36 is a perspective view of another electrical receptacle subassembly having a one-piece over-molded receptacle body and insulative wiring jacket.
Figure 37:
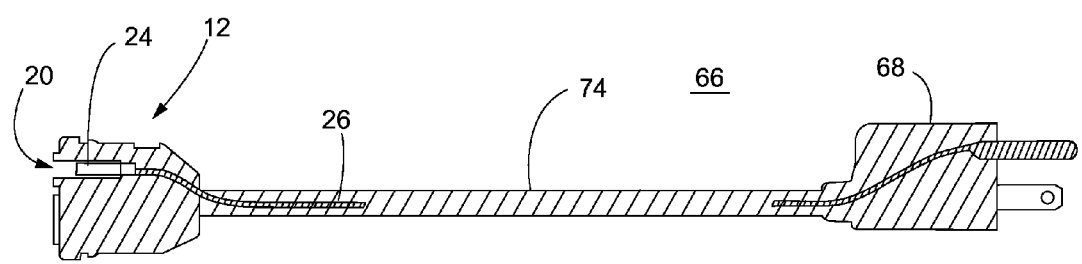
FIG. 37 is a side sectional view taken along line section line XXXVII-XXXVII in FIG. 35.

In another embodiment, a wiring harness or assembly 66' (FIGS. 35 and 37) is constructed similarly to harness 66, except that with wiring assembly 66' the molded insulative material used to form front surface portion 18 and receptacle body 22 of receptacle subassembly 12 is unitarily formed with the insulative material of plug 68 and an insulative coating or jacket 74 surrounding the individual insulated wires of wiring 26, whereby all electrically conducting surfaces of wiring harness 66' (except for the electrical contacts or prongs that are necessarily exposed to the outside environment) are electrically isolated and insulated from one another by a contiguous sealed material, such as shown in FIG. 37. Although it is envisioned that the insulative material could be molded or applied in a single molding operation, it is further envisioned that substantially the same result may be achieved in a multi-step process, such as using vulcanization or heat to establish a seamless outer insulative jacket or surface. In still other embodiments, two or more electrical receptacle subassemblies 12 with respective housings and face plates 16 may be connected to (and powered through) a splitter 76, such as shown in FIG. 5.

Accordingly, the electrical receptacle assemblies of the present invention may be made sufficiently small and compact to fit in unconventional spaces, and can also be made resistant to liquid spills or other forms of contamination that may be more common in such locations. A compact housing surrounds and protects an electrical receptacle subassembly, and can be engaged by face plates of many different sizes and shapes, so that the finished receptacle assembly is readily adaptable for use in different types and shapes of mounting surfaces, ranging from furnishings to other appliances or the like. In this way, it is possible to install contaminant-resistant electrical power receptacles, electronic data receptacles, and communications jacks or outlets in non-traditional locations according to the needs of a particular user or work area, and each electrical receptacle assembly may be custom-tailored to a particular installation area or surface by changing only one or two components, such as the face plate.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. An electrical receptacle assembly comprising:
   a face plate defining a receptacle opening;
   an electrical receptacle subassembly having a main receptacle body, a front surface portion defining at least one contact opening, electrical wiring, and a plurality of electrical contacts disposed in said main receptacle body behind said front surface portion and electrically coupled to said electrical wiring, said electrical contacts being accessible through said at least one contact opening;
   wherein said electrical receptacle subassembly is configured for insertion of said main receptacle body through said receptacle opening with said front surface portion engaging said face plate at said receptacle opening, whereby said electrical receptacle subassembly is supported by said face plate;
   a housing defining a cavity for receiving said main receptacle body, said housing having a front opening through which said main receptacle body is received, and a rear opening through which passes said electrical wiring; and
   wherein said face plate is coupled directly to said housing at said front opening.

2. The electrical receptacle assembly of claim 1, wherein:
   said face plate comprises at least one hollow projection configured to extend into said housing when said face plate is coupled thereto;
   said housing defines at least one fastener opening that is substantially aligned with said hollow projection; and
   a fastener that extends through said fastener opening and engages said hollow projection;
   wherein said fastener and said at least one hollow projection cooperate to secure said face plate at said housing.

3. The electrical receptacle assembly of claim 2, comprising at least two of said hollow projections, at least two of said fastener openings, and at least two of said fasteners.

4. The electrical receptacle assembly of claim 2, wherein said hollow projection comprises a tubular cylinder and said housing defines an elongate channel configured for receiving said tubular cylinder, wherein said elongate channel terminates at said fastener opening, and wherein said fastener comprises a threaded shaft configured to engage an inner surface of said tubular cylinder.

5. The electrical receptacle assembly of claim 4, wherein said face plate is substantially planar.

6. The electrical receptacle assembly of claim 5, wherein said face plate is polygonal or circular in shape.

7. The electrical receptacle assembly of claim 1, wherein said face plate comprises a concave rear surface and said housing comprises a convex forward surface defining at least a portion of said front opening, wherein said concave rear surface sealingly engages said convex forward surface at said front opening.

8. The electrical receptacle assembly of claim 1, wherein said face plate sealingly engages said housing at said front opening.

9. The electrical receptacle assembly of claim 8, further comprising a wire grommet disposed in said rear opening of said housing, said wire grommet configured for receiving the electrical wiring.

10. The electrical receptacle assembly of claim 1, wherein said face plate comprises a formed channel member defining a recessed region in which said front surface portion of said electrical receptacle subassembly is positioned and accessible.

11. The electrical receptacle assembly of claim 1, wherein said face plate defines at least one fastener opening configured to receive a fastener for attaching said electrical receptacle assembly to a surface.

12. The electrical receptacle assembly of claim 1, wherein said face plate comprises a resilient latch tab for releasably securing said face plate to an opening formed in a surface.

13. The electrical receptacle assembly of claim 1, further comprising:
   an electrical plug having a insulative body and a plurality of male prongs in electrical communication with said electrical wiring of said electrical receptacle subassembly; and
   a contiguous molded rubber or rubber-like insulative coating forming (i) said main receptacle body, (ii) said front surface portion, (iii) said insulative body of said electrical plug, and (iv) an insulative jacket around said electrical wiring between said main receptacle body and said electrical plug, and filling spaces disposed between said electrical contacts of said electrical receptacle subassembly.

14. An electrical receptacle assembly comprising:
   a face plate defining a receptacle opening and having at least one tubular projection configured to extend into a housing when said face plate is coupled thereto;
   an electrical receptacle subassembly having a main receptacle body, a front surface portion defining at least one contact opening, electrical wiring, and a plurality of electrical contacts disposed in said main receptacle body behind said front surface portion and electrically coupled to said electrical wiring, said electrical contacts being accessible through said at least one contact opening;
   wherein said electrical receptacle subassembly is configured for insertion of said main receptacle body through said receptacle opening with said front surface portion engaging said face plate at said receptacle opening, whereby said electrical receptacle subassembly is supported by said face plate;
   said housing defining a cavity for receiving said main receptacle body, an elongate channel for receiving said tubular projection of said face plate, and a fastener opening at an end of said elongate channel, said housing having a front opening through which said main receptacle body is received, and a rear opening through which passes said electrical wiring; and a fastener extending through said fastener opening an into said elongate channel for engagement with said tubular projection.

15. The electrical receptacle assembly of claim 14, wherein said face plate is coupled directly to said housing at said front opening, and wherein said fastener threadedly engages said tubular projection.

16. The electrical receptacle assembly of claim 15, wherein said elongate channel is open to said cavity.

17. The electrical receptacle assembly of claim 14, further comprising:
- an electrical plug having a insulative body and a plurality of male prongs in electrical communication with said electrical wiring of said electrical receptacle subassembly; and
- a contiguous molded rubber or rubber-like insulative coating forming (i) said main receptacle body, (ii) said front surface portion, (iii) said insulative body of said electrical plug, and (iv) an insulative jacket around said electrical wiring between said main receptacle body and said electrical plug, wherein said insulative coating is further disposed between said electrical contacts of said electrical receptacle subassembly.

18. The electrical receptacle assembly of claim 14, wherein said face plate comprises a curved rear surface and said housing comprises a curved forward surface defining at least a portion of said front opening and having a curvature that generally corresponds to said curved rear surface of said face plate.

19. The electrical receptacle assembly of claim 18, wherein said curved rear surface of said face plate sealingly engages said curved forward surface of said housing at said front opening.

20. The electrical receptacle assembly of claim 14, wherein said face plate comprises at least one chosen from (i) a fastener opening configured to receive a fastener for attaching said electrical receptacle assembly to a surface, and (ii) a resilient latch tab for releasably securing said face plate to an opening formed in a surface.

* * * * *